(12) United States Patent
Wedi et al.

(10) Patent No.: US 8,588,545 B2
(45) Date of Patent: Nov. 19, 2013

(54) STATISTICAL IMAGE ENHANCING METHOD, IMAGE CODING METHOD, AND IMAGE DECODING METHOD

(75) Inventors: Thomas Wedi, Gross-Umstadt (DE); Florian Knicker, Dreieich (DE)

(73) Assignee: Panasonic Corporation, Osaka (JP)

( * ) Notice: Subject to any disclaimer, the term of this patent is extended or adjusted under 35 U.S.C. 154(b) by 921 days.

(21) Appl. No.: 12/663,872

(22) PCT Filed: Jun. 10, 2008

(86) PCT No.: PCT/JP2008/001472
§ 371 (c)(1),
(2), (4) Date: Dec. 10, 2009

(87) PCT Pub. No.: WO2008/152797
PCT Pub. Date: Dec. 18, 2008

(65) Prior Publication Data
US 2010/0177973 A1 Jul. 15, 2010

(30) Foreign Application Priority Data
Jun. 12, 2007 (EP) .................................. 07011510

(51) Int. Cl.
*G06K 9/40* (2006.01)
(52) U.S. Cl.
USPC .......................................... 382/275; 382/233
(58) Field of Classification Search
None
See application file for complete search history.

(56) References Cited

U.S. PATENT DOCUMENTS

| 5,699,459 | A | * | 12/1997 | Kawahara ..................... 382/268 |
| 5,757,974 | A | * | 5/1998 | Impagliazzo et al. ......... 382/248 |
| 5,799,111 | A | * | 8/1998 | Guissin .......................... 382/254 |
| 6,249,610 | B1 | | 6/2001 | Matsumoto et al. |
| 6,324,301 | B1 | | 11/2001 | Jacquin et al. |
| 6,804,408 | B1 | | 10/2004 | Gallagher et al. |
| 6,847,738 | B1 | | 1/2005 | Scognamiglio et al. |
| 6,868,190 | B1 | * | 3/2005 | Morton ......................... 382/278 |
| 7,164,806 | B2 | | 1/2007 | Prestia |
| 7,903,892 | B2 | * | 3/2011 | Oldcorn et al. ............... 382/239 |
| 8,090,212 | B1 | * | 1/2012 | Baxansky et al. ............. 382/260 |

(Continued)

FOREIGN PATENT DOCUMENTS

EP 0 786 904 A2 7/1997
JP 09-081104 3/1997

(Continued)

OTHER PUBLICATIONS

International Search Report issued Sep. 16, 2008 in International (PCT) Application No. PCT/JP2008/001472.

(Continued)

*Primary Examiner* — Sean Motsinger
(74) *Attorney, Agent, or Firm* — Wenderoth, Lind & Ponack, L.L.P.

(57) ABSTRACT

The present invention relates to processing an image by using a statistical property of a reference image. An image enhancing apparatus according to the present invention includes: a first image processing unit (120) and a second processing unit (130) which receive an input image, receive statistical properties of a difference image, generate a filter based on the statistical properties of the difference image which have been received by the property receiving unit, and apply the filter to the input image so as to generate a filtered image; and an adder (140) which adds the filtered image to the input image so as to generate an output image.

29 Claims, 8 Drawing Sheets

(56) References Cited

U.S. PATENT DOCUMENTS

| | | | | |
|---|---|---|---|---|
| 8,189,934 | B2* | 5/2012 | Wittmann et al. | 382/232 |
| 2002/0067432 | A1* | 6/2002 | Kondo et al. | 348/576 |
| 2010/0021071 | A1* | 1/2010 | Wittmann et al. | 382/232 |
| 2010/0027686 | A1* | 2/2010 | Zuo et al. | 375/240.29 |
| 2010/0067574 | A1* | 3/2010 | Knicker et al. | 375/240.12 |
| 2010/0177973 | A1* | 7/2010 | Wedi et al. | 382/233 |
| 2010/0254463 | A1* | 10/2010 | Narroschke et al. | 375/240.29 |

FOREIGN PATENT DOCUMENTS

| | | |
|---|---|---|
| JP | 09-215009 | 8/1997 |
| JP | 10-66078 | 3/1998 |
| JP | 10-70717 | 3/1998 |
| JP | 2004-260415 | 9/2004 |
| JP | 2006-211152 | 8/2006 |

OTHER PUBLICATIONS

European Search Report issued Apr. 3, 2008 in corresponding European Application No. 07 01 1510.

Javier Portilla et al., "A Parametric Texture Model Based on Joint Statistics of Complex Wavelet Coefficients", International Journal of Computer Vision, 2000, vol. 40, No. 1, pp. 49-71.

Kiyohito Narita et al. "DCT Fugoka Gazo ni Okeru Ryoshika Zatsuon no Hanpuku Keigenho (Iterative Reduction of Quantization Noise in DCT Compressed Images)", The transactions of the Institute of Electronics, Information and Communication Engineers, The Institute of Electronics, Information and Communication Engineers, Jan. 1996, vol. J79-A, No. 1, pp. 69-76.

Adriana Dumitraş et al., "An Encoder-Decoder Texture Replacement Method With Application to Content-Based Movie Coding", IEEE Transactions on Circuits and Systems for Video Technology, vol. 14, No. 6, Jun. 2004, pp. 825-840.

Patrick Ndjiki-Nya et al., "Improved H.264/AVC Coding Using Texture Analysis and Synthesis", Proc Icip 2003, 3: pp. 849-852, 2003.

Steffen Wittmann et al., "SEI message on post-filter hints for high fidelity", Joint Video Team (JVT) of ISO/IEC MPEG & ITU-T VCEG (ISO/IEC JTC1/SC29/WG11 and ITU-T SG16 Q.6), JVT-T039R1, Jul. 2006, pp. 1-12.

Yongyi Yang et al., "Regularized Reconstruction to Remove Blocking Artifacts from Block Discrete Cosine Transform Compressed Images", Proceedings of the SPIE, vol. 2094, Nov. 8, 1993, pp. 511-521.

* cited by examiner

STATISTICAL IMAGE ENHANCING METHOD, IMAGE CODING METHOD, AND IMAGE DECODING METHOD

TECHNICAL FIELD

The present invention relates to a method of improving subjective image quality, and relates particularly to a method of coding images and video data providing improved subjective image quality.

BACKGROUND ART

An object of conventional signal representation methods is to present a signal in such a manner as to minimize an objective image quality measure based on the mean square error (MSE). These methods include, for example, pulse code modulation (PCM), differential pulse code modulation (DPCM), or a conversion-based method.

Such image quality measures do not correspond to the results obtained when a human observer subjectively compares image qualities. It is known that a human visual system (hereinafter, referred to as HVS) is sensitive to several kinds of image properties when comparing image qualities. More specifically, the HVS cannot distinguish textures having the same higher order statistics when viewing them only preattentively. Thus, some texture synthesis methods are based on synthesizing textures matching higher order statistics of another given texture (See: Patent Reference 1). The texture synthesis methods are used for an image that is to be retouched to fill in a hole or remove an object in a scene. However, in video coding, there is another approach which is to synthesize a plurality of textures rather than to code them directly (See: Non-Patent Reference 2 and Non-Patent Reference 3).

In addition, another conventional method of improving the subjective image quality for the HVS is to sharpen images. A common technique is to use an unsharp mask or local contrast enhancement to render the image shaper.

In the manner as described above, it is possible to improve the subjective image for the HVS by using techniques of synthesizing textures or sharpening images.

Non-Patent Reference 1: J. Portilla and E. P. Simoncelli, A parametric texture model based on joint statistics of complex wavelet coefficients, Int. J. Comput. Vis., vol. 40, no. 1, pp. 49-71, 2000

Non-Patent Reference 2: A. Dumitras and B. G. Haskell, An encoder-decoder texture replacement method with application to content-based movie coding, IEEE Trans. Circuits Syst. Video Technol., 14: 825-840, 2004

Non-Patent Reference 3: P. Ndjiki-Nya, et al., Improved H.264 coding using texture analysis and synthesis, Proc Icip 2003, 3: 849-852, 2003

DISCLOSURE OF INVENTION

Problems that Invention is to Solve

However, according to conventional techniques, the techniques can yield stronger impression as a result but can also lead to producing unnatural appearance or halo artifacts (coding distortion).

Thus, an object of the present invention is to provide a method for improving subjective image quality, and particularly to provide an image coding method for coding an image and a video which yields an improved subjective image quality, and a coding apparatus, a decoding apparatus, and an image enhancing apparatus to which the image coding method is applicable.

Means to Solve the Problems

In order to solve the conventional problems described above, a unique approach according to the present invention is to enhance subjective image quality by reconstructing a missing frequency component, based on the statistical properties thereof.

An image coding method according to the present invention includes: compressing an input image; coding a compressed image; calculating a difference image between the input image and the compressed image; extracting a statistical property of the calculated difference image; and coding the extracted statistical property of the calculated difference image.

With this, it is possible to extract and code a statistical property related to a component which is originally to be lost, thus allowing the lost component to be restored. Accordingly, compared to the case of simply decoding a coded image, it is possible to generate an image of excellent quality.

In addition, the image decoding method according to the present invention includes: decoding a compressed image; decompressing a decoded image; decoding a statistical property of a difference image; generating a first filter, based on the decoded statistical property of the difference image; applying the first filter to a decompressed image, so as to generate a filtered image; and adding the filtered image to the decompressed image, so as to generate an output image.

With this, it is possible to restore, at the time of decoding, the statistical property related to the component which is lost in the coding, thus allowing generating an image of excellent quality as compared to the case of simply decoding the coded image.

In addition, the image enhancing method according to the present invention includes: receiving an input image; receiving a statistical property of a difference image; generating a first filter, based on the received statistical property of the difference image; applying the first filter to the input image, so as to generate a filtered image; and adding the filtered image to the input image so as to generate an output image.

With this, it is possible to restore the statistical property related to the component which should originally be included in the input image, thus allowing generating an image of excellent quality.

In addition, an image coding apparatus according to the present invention includes: an image compressor which compresses an input image; a first coder which codes a compressed image; a subtracter which calculates a difference image between the input image and the compressed image; a first statistical analyzer for extracting a statistical property of the calculated difference image; and a second coder which codes the extracted statistical property of the calculated difference image.

In addition, an image decoding apparatus according to the present invention includes: a first decoder which decodes the compressed image; an image decompressor which decompresses a decoded image; a second decoder which decodes the statistical property of the difference image; an image processing unit for generating the first filter, based on the decoded statistical property of the difference image, and applying the first filter to the decompressed image so as to generate a filtered image; and an adder which adds the filtered image to the decompressed image, so as to generate an output image.

In addition, an image enhancing apparatus according to the present invention includes: a first input unit which receives an input image; a second input unit which receives a statistical property of a difference image; a first image processing unit for generating a first filter, based on the received statistical property of the difference image, and applying the first filter to the input image so as to generate a filtered image; and an adder which adds the input image to the filtered image so as to generate an output image.

In addition, it is preferable that the statistical property of the difference image to be used include an autocorrelation function value of the difference image and at least one of mean, variance, skewness, and kurtosis of pixel values of the difference image.

With this, these statistical property is determined by an effective algorithm and can thus yield a texture which renders the enhanced image more natural.

In addition, it is preferable that the first filter be adapted so as to adjust a statistical property of the filtered image to the statistical property of the difference image. It is preferable that the first filter be generated based on the statistical property of the difference image, that is, a target value for the statistical property and the statistical property extracted from the decompressed (input) image itself, that is, a real value.

With this, it is possible to reconstruct the missing frequency component, using only the statistical property.

In addition, it is preferable that the method further include: generating a second filter by using the statistical property of the input image (reference image), based on the statistical property; and applying the second filter to the output image. It is preferable that the second filter be adapted so as to adjust the statistical property of the output image to the decoded (received) statistical property of the reference image. It is preferable that these properties include at least one of mean, variance, skewness and kurtosis of pixel values of each image.

With this, it is possible to further improve image quality as a result.

In addition, it is preferable that the method include calculating a difference between the output image and the decoded (input) image, and the applying the first filter and the adding are repeatedly applied to the calculated difference.

With this, it is possible to match the statistical property of the missing frequency component to that of the reference image with a higher degree of accuracy.

In addition, it is preferable that a conversion-based coding framework be used to compress and decompress the input-decoded image.

With this, by using such an advanced conversion-based coding framework, it is possible to achieve a coding efficiency using a highly-efficient algorithm.

In addition, when coding the input image, it is preferable that the input image be low-pass filtered before it is compressed.

With this, due to attenuation of the frequency component, it is possible to code the low-pass filtered image more efficiently. However, it is possible to reconstruct such an attenuated component, using the statistical property on the decoder side. In this respect, it is possible to improve efficiency in coding without affecting image quality.

Effects of the Invention

According to the present invention, it is possible to enhance image quality without giving unnatural effects to images, such as over-sharpening or halo artifacts.

BRIEF DESCRIPTION OF DRAWINGS

The object described above, another object and a feature of the present invention will be further clarified by the description and preferred embodiments below with reference to the drawings.

| Numerical References | |
|---|---|
| 100 | Statistical image enhancing apparatus |
| 110, 230 | Subtracter |
| 120 | First image processing unit |
| 130 | Second image processing unit |
| 140 | Adder |
| 150 | Third image processing unit |
| 200, 201 | Coding apparatus |
| 210 | Image/video coder |
| 220 | Image/video decoder |
| 240 | First statistical analyzer |
| 250 | Second statistical analyzer |
| 260 | Statistical property coder |
| 270 | Multiplexer |
| 280 | Filtering unit |
| 300 | Decoding apparatus |
| 360 | Statistical property decoder |
| 370 | Demultiplexer |
| 400 | Image processing apparatus |
| 410 | Bus |
| 420 | Memory |
| 430 | First frame memory |
| 440 | Second frame memory |

BEST MODE FOR CARRYING OUT THE INVENTION

First Embodiment

A statistical image enhancing apparatus and a statistical image enhancing method according to a first embodiment are provided to tweak an image based on statistical data of a reference image. For example, when an original image I and a low-pass image $I_l$ are given, the statistical image enhancing apparatus and the statistical image enhancing method of the present embodiment reconstruct a missing frequency component by adjusting some image statistics. With this, it is possible to enhance the low-pass image $I_l$.

In the statistical image enhancing method of the present embodiment, in a first step, the higher order statistics and the autocorrelation of the original image I and a difference image $I_d$ (=I−$I_l$) are analyzed. In a second step, the result of the analysis is used to reconstruct the missing frequency component in the low-pass image $I_l$.

Figure 1:
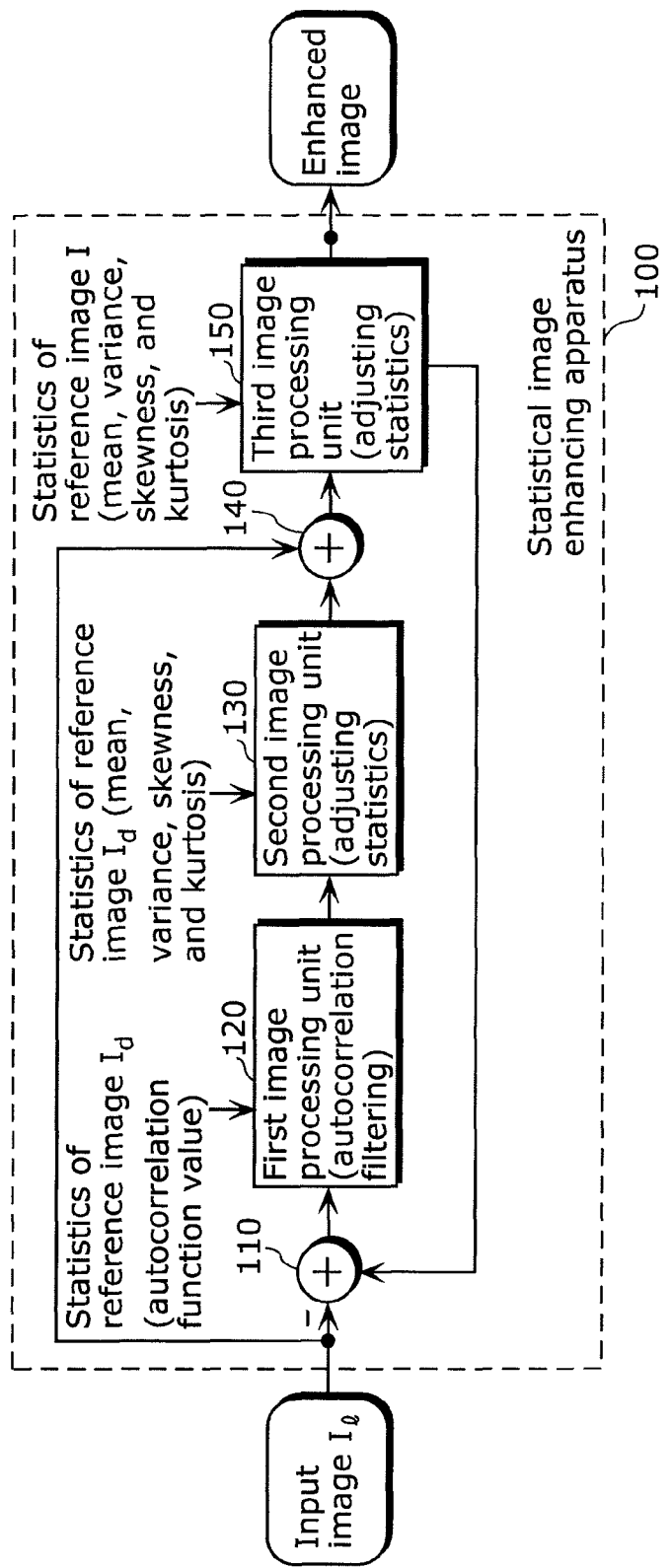
FIG. 1 is a block diagram showing a structure of a statistical image enhancing apparatus of a first embodiment.

FIG. 1 is a block diagram showing a configuration of a statistical image enhancing apparatus 100 of the first embodiment. The statistical image enhancing apparatus 100 shown in the figure includes: a subtracter 110, a first image processing unit 120, a second image processing unit 130, an adder 140, and a third image processing unit 150.

The subtracter 110 calculates a difference between an input image and an output image outputted from a third image processing unit 150. Note that when the output image from the third image processing unit 150 is not yet generated, the processing in the subtracter 110 is omitted, and the input image is directly inputted to the first image processing unit 120.

The first image processing unit 120 receives an output from the subtracter 110. In addition, as described above, the first image processing unit 120 receives the input image $I_l$ when the output image from the third image processing unit 150 is not yet generated. Note that the input image $I_l$ is a low-pass image corresponding to the image that is generated by low-pass filtering the original image I. For example, the input image $I_l$ is an image decoded by an external image/video decoder.

Furthermore, the first image processing unit 120 receives statistical properties of the first reference image $I_d$. Then, the first image processing unit 120 applies a filter for matching spatial statistical properties of the input image to spatial statistical properties of the first reference image $I_d$. The first reference image $I_d$ corresponds to, for example, a difference between the original image I and the low-pass image $I_l$, that is, $I_d$=I−$I_l$. In this case, the filter basically corresponds to a closely designed high-pass filter.

More specifically, the first image processing unit 120 receives an autocorrelation function value of the first reference image $I_d$ as the statistical properties of the first reference image $I_d$. In addition, the first image processing unit 120 extracts an autocorrelation function value of the output image from the subtracter 110 or the input image $I_l$. The first image processing unit 120 generates a filter based on the received autocorrelation function value and the extracted autocorrelation function value, and applies the generated filter to the image inputted from the subtracter 110 or the input image $I_l$.

The first image processing unit 120 outputs the image filtered as above to the second image processing unit 130.

The first image processing unit 120 preferably performs autocorrelation filtering so as to adjust (part of) the autocorrelation function of the image to the autocorrelation function calculated for the first reference image. To achieve this object, the first image processing unit 120 determines a filtering coefficient based on the autocorrelation function value of the input image and the autocorrelation function value of the first reference image, which forms part of the spatial statistical properties. Any technical method may be used to determine such a filter. Particularly, the method shown in Non-Patent Reference 1 may be used.

However, the statistical image enhancing apparatus according to the present embodiment is not limited to the use of the autocorrelation filtering but may also use other spatial statistical properties of the image to match the input image and the reference image. For example, statistical properties such as a Fourier transform coefficient, a wavelet transform coefficient, and a correlation between different subbands of the image may also be used. Furthermore, another method for designing an optimal filter may also be used, such as a Wiener filter design.

Note that when sharpening an image, values of the autocorrelation function in a neighborhood of zero are particularly relevant. Accordingly, the first image processing unit 120 determines a filter coefficient of an N×N-tap filter, based on N×N zero-neighborhood values of the autocorrelation function between the input image and the first reference image. In this case, it has proved that N=7 is optimal. However, any other number of taps may be used likewise. The filter having a filter coefficient thus determined is applied to the input image so as to generate an output from the first image processing unit 120.

The second image processing unit 130 receives statistical properties of the first reference image $I_d$. Specifically, the second image processing unit 130 receives higher order statistical properties of the first reference image $I_d$. The second image processing unit 130 matches the higher order statistical properties of the image inputted from the first image processing unit 120 to the higher order statistical properties of the first reference image. The second image processing unit 130 is adapted so as to adjust the higher order properties of each input signal. The higher order statistical properties include marginal statistics descriptors such as mean, variance, skewness, and kurtosis of the pixel values. For example, mean and variance may also be considered as measures for average brightness and contrast of images, respectively.

Optimal results can be obtained by adjusting the marginal distribution up to a fourth-order moment, that is, adjusting all of mean, variance, skewness, and kurtosis. However, the statistical image enhancing apparatus according to the present embodiment is not limited in this respect. Other statistical properties may be used likewise. For example, in addition to part of the properties described above, other statistical properties such as a high order moment of the marginal distribution, a spatial correlation of pixel values, and the correlation between the subbands of the image may also be used.

The second image processing unit 130 determines a transformation that maps each pixel value to a target pixel value so as to meet the desired marginal statistical constrains. For example, mean and variance can be matched by subtracting a mean of the input signal from each pixel value, scaling the result at a ratio between a target standard deviation (for example, the square root of variance) and the standard deviation of the input signal, and adding a mean value of the target to the scaled result. Likewise, skewness and kurtosis can be adjusted by applying a sixth-order polynomial to the pixel value. Any known technique for determining a coefficient for such a transformation may be used. For example, a gradient projection algorithm and the technique disclosed in Non-Patent Reference 1 may also be used. Note that skewness is a value indicating asymmetry of distribution. Kurtosis is a value indicating a degree of distribution density near the mean value. A detailed method of calculating mean, variance, skewness, and kurtosis is shown in Non-Patent Reference 1, for example.

The second image processing unit 130 extracts, from among the higher order statistical properties of the image inputted from the first image processing unit 120, at least one higher order statistical property corresponding to the higher order statistical properties (at least one of the mean, variance, skewness and kurtosis of the pixel value) of the first reference image $I_d$ that is received. Then, the second image processing unit 130 adjusts the extracted higher order properties to match the higher order properties of the first reference image $I_d$.

The second image processing unit 130 outputs to the adder 140, the image of which the higher order properties have been adjusted.

The adder 140 adds the output from the second image processing unit 130 and the input image, so as to provide an output to the third image processing unit 150.

The third image processing unit 150 receives the statistical properties of the second reference image I. Specifically, the third image processing unit receives higher order statistical properties of the second reference image I. Note that the second reference image I is the original image, for example. The third image processing unit 150 is adapted so as to adjust the higher order properties of each input signal.

The third image processing unit 150 performs the same processing as the second image processing unit 130. A difference is that the third image processing unit 150 receives, as an input, an output from the adder 140 and the second reference image I.

The first image processing unit 120, the second image processing unit 130, and the third image processing unit 150 do not independently adjust the statistical properties. Therefore, the adjustment may be repeated for better results. To achieve this object, the output from the third image processing unit 150 is provided to the subtracter 110, so as to subtract the input image and apply the processing step described above to the calculated difference image.

Note that it has proved that it is optimal to repeat such adjustment approximately seven times. As described above, in an initial (that is, 0th) repetition, it is not yet possible to use the output from the third image processing unit 150; thus, the subtracter 110 may be omitted by providing a switch (not shown), for example, so as to directly provide the input image to the first image processing unit 120. Note that an arbitrary input image (not shown) may be provided from a conventional sharpening algorithm to substitute the unavailable output from the third image processing unit 150.

The first image processing unit 120, the second image processing unit 130, and the third image processing unit 150 each perform nonlinear image conversion in a sense that the coefficients involved depend on the current image. Hence, the filter and the conversion applied by the image processing unit are updated in each repetition. Since the statistical properties of the image are converged on a desired value, the repetition is performed so as to reduce the influence of such filtering-conversion processing.

As described above, the statistical image enhancing apparatus according to the present embodiment enhances the image quality of the input image in two stages. That is, the first image processing unit 120 and the second image processing unit 130 enhance the image quality of the difference image, and the third image processing unit 150 enhances the image quality of the entire image that is added with the input image. With this, it is possible to obtain an image having an exceptional quality.

Subsequently, an operation of the statistical image enhancing apparatus according to the present embodiment is described.

Figure 2:
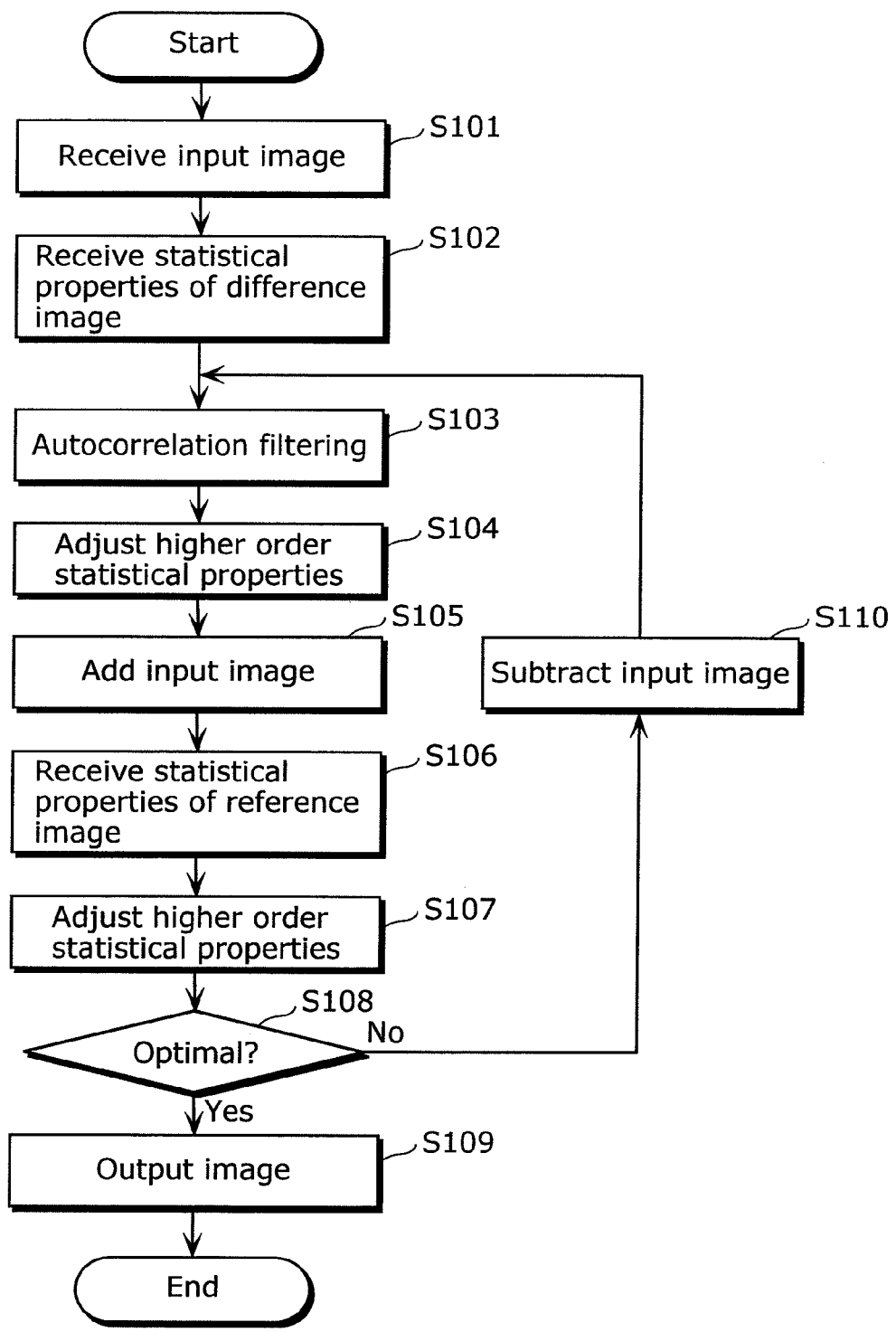
FIG. 2 is a flowchart showing an operation of the statistical image enhancing apparatus of the first embodiment.

FIG. 2 is a flowchart showing an operation of the statistical image enhancing apparatus according to the present embodiment.

The statistical image enhancing apparatus 100 receives an input image (S101). The input image which is received is inputted to the first image processing unit 120. Next, the statistical image enhancing apparatus 100 receives the statistical properties of the difference image (S102). Of the statistical properties of the received difference image, the autocorrelation function value is inputted to the first image processing unit 120. Of the statistical properties of the received difference image, higher order statistical properties (at least one of mean, variance, skewness, and kurtosis) are inputted to the second image processing unit 130. Note that the difference image is, for example, a difference between the original image and the low-pass image that is generated by low-pass filtering the original image. The difference image may also be an image that is generated by high-pass filtering the original image.

The first image processing unit 120 performs autocorrelation filtering (S103). Specifically, first, the first image processing unit 120 extracts an autocorrelation function value of the input image. Then, the first image processing unit 120 generates a filter by determining a filter coefficient based on the extracted autocorrelation function value of the input image and the autocorrelation function value of the inputted difference image. The first image processing unit 120 applies the generated filter to the input image so as to adjust the autocorrelation function value of the input image to the autocorrelation function value of the difference image. The first image processing unit 120 outputs the filtered image to the second image processing unit 130.

The second image processing unit 130 adjusts the higher order statistical properties of the image filtered by the first image processing unit 120 (S104). Specifically, first, the second image processing unit 130 extracts the higher order statistical properties (at least one of mean, variance, skewness, and kurtosis) of the image inputted from the first image processing unit 120. Then, the second image processing unit 130 generates a filter by determining a filter coefficient based on the extracted higher statistical properties and the higher statistical properties of the inputted difference image. The second image processing unit 130 applies the generated filter to the filtered image so as to adjust the higher order statistical properties of the filtered image to the higher order properties of the difference image. The second image processing unit 130 outputs the filtered image to the adder 140.

The adder 140 adds the image inputted from the second image processing unit 130 and the input image (S105).

Next, statistical image enhancing apparatus 100 receives the statistical properties (at least one of mean, variance, skewness, and kurtosis) of the reference image (S106). The received statistical properties of the reference image are inputted to the third image processing unit 150. Note that the reference image is an image including a high-frequency component that is missing from the input image.

The third image processing unit 150 adjusts the higher statistical properties of the image added by the adder 140 (S107). Specifically, first, the third image processing unit 150 extracts higher order properties (at least one of mean, variance, skewness, and kurtosis) of the image that are added by the adder 140. Then, the second image processing unit 130 generates a filter by determining a filter coefficient based on the extracted higher statistical properties and the higher statistical properties of the inputted difference image. The third image processing unit 150 applies the generated filter to the added image so as to adjust, to the higher order statistical properties of the reference image, the higher order statistical properties of the image that are added by the adder 140. The third image processing unit 150 outputs the filtered image as an output image.

The statistical image enhancing apparatus 100 determines whether or not the output image from the third image processing unit 150 is optimal (S108). According to the present embodiment, since it is possible to generate an optimal output image by repeating the above processing (S103 to S107)

seven times, the statistical image enhancing apparatus 100 determines whether or not the processing has been performed seven times.

When the above processing (S103 to S107) has been performed seven times (Yes in S108), the statistical image enhancing apparatus 100 outputs an output image (S109).

When the above processing (S103 to S107) has not been performed seven times (No in S108), the output image is inputted to the subtracter 110. The subtracter 110 subtracts the input image from the output image (S110). The subtracted image is inputted to the first image processing unit 120, and the statistical image enhancing apparatus 100 repeats the above processing (S103 to S107). Note that the above processing is performed, for example, in units of macroblocks.

With the processing described above, the statistical image enhancing apparatus 100 of the present embodiment can enhance the image quality of the input image.

As described above, according to the statistical image enhancing apparatus and the statistical image enhancing method of the present embodiment, it is possible to enhance the subjective image quality of the input image by using the statistical properties of the reference image, particularly, the statistical properties of the reference image which includes the frequency component that is missing from the input image. Note that the input image cannot be enhanced by directly using the reference image. Rather, only selected statistical properties of the reference image can be taken into account. However, any relevant statistical property may be obtained from another source, estimated, or approximated. For example, when the input image contains more frequency information in one image direction, the statistics in this direction can be used to construct the high-frequency component in a direction orthogonal to the direction.

In addition, according to the statistical image enhancing apparatus and the statistical image enhancing method of the present embodiment, it is possible to avoid the problems of the conventional sharpening algorithm. Particularly, oversharpening and halo artifacts are prevented from occurring by using the statistical properties of the reference image. Furthermore, the statistical image enhancing apparatus and the statistical image enhancing method of the present embodiment are not limited to the object to enhance sharpness. Since selection of statistics is taken into account, textures, in particular, appear highly natural.

Second Embodiment

Figure 3:
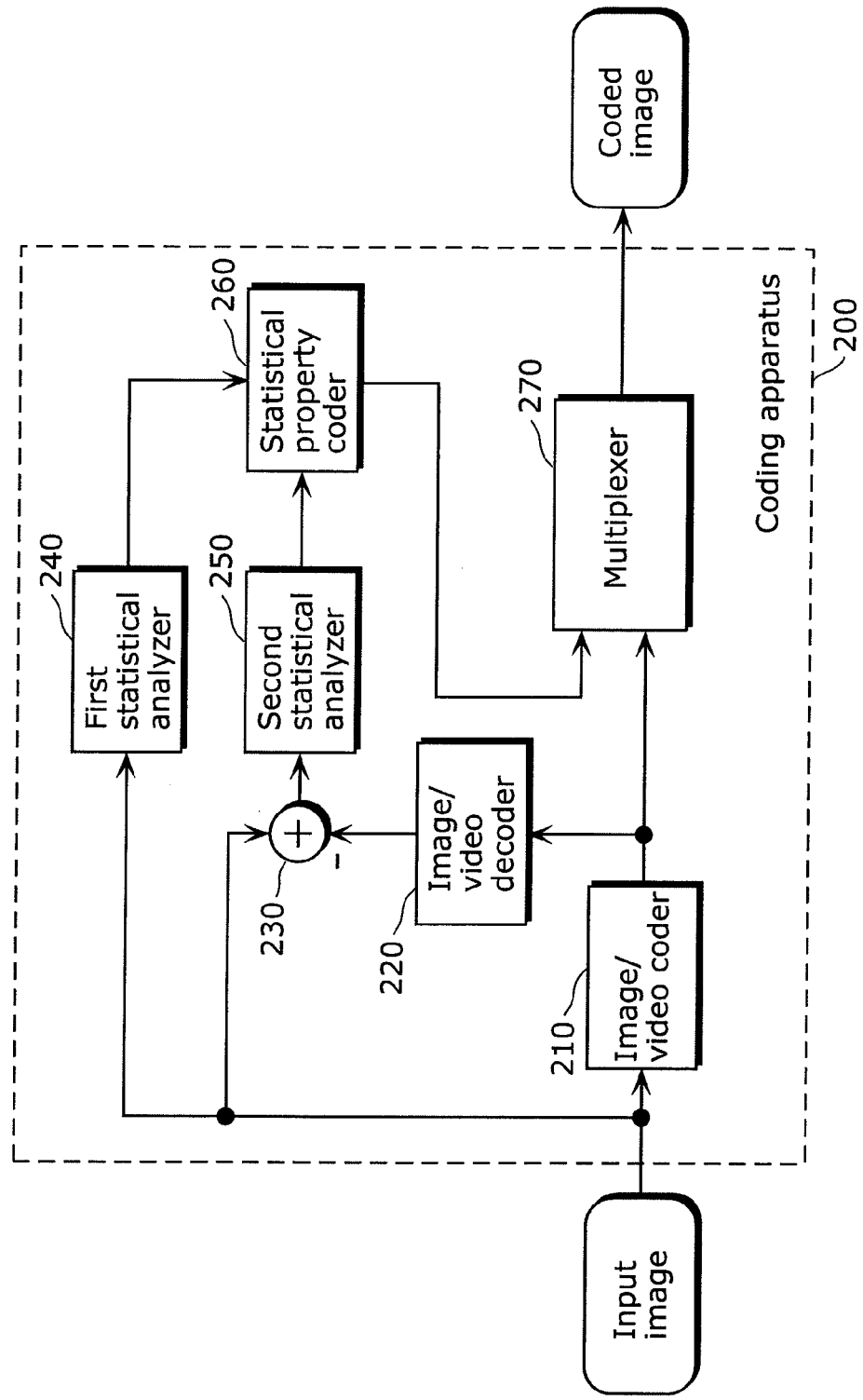
FIG. 3 is a block diagram showing a configuration of an image/video coding apparatus according to a second embodiment.

FIG. 3 is a block diagram showing a configuration of an image/video coding apparatus according to a second embodiment. A coding apparatus 200 in the figure includes: an image/video coder 210, an image/video decoder 220, a subtracter 230, a first statistical analyzer 240, a second statistical analyzer 250, a statistical property coder 260, and a multiplexer 270.

The image/video coder 210 compresses and codes an input image obtained from the outside. Note that the image/video coder 210 of the present embodiment performs low-pass filtering on the input image, so as to compress and code the low-pass filtered image. For example, the image/video coder 210 codes the input image in accordance with an (irreversible) coding scheme as represented by techniques including JPEG, MPEG-1, 2, and 4, and H. 264/AVC.

The image/video decoder 220 decodes the coded input image. Furthermore, the image/video decoder 200 decompresses the decoded image.

The subtracter 230 calculates a difference image between the input image and a compressed image. Note that the compressed image as referred to here is an image restored by decoding and decompression performed by the image/video decoder 220. More specifically, the subtracter 230 subtracts, from the input image obtained from the outside, the compressed image, which has been compressed and coded by the image/video coder 210 and then decoded by the image/video decoder 220. In other words, the subtracter 230 determines a difference between an original image signal and an internally-decoded signal, that is, a coding error. The difference signal is supplied to the second statistical analyzer 250 so as to determine the statistical properties involving the coding error.

The first statistical analyzer 240 extracts statistical properties from the input images obtained from the outside.

The second statistical analyzer 250 extracts a difference image, that is, the statistical properties of the coding error. Then, the statistical properties are coded by the statistical property coder 260, and the multiplexer 270 multiplies the coded statistical properties by the output from the image/video coder 210 so as to generate a coded output image. In addition to the statistical properties of the coding error, the output may include the coded statistical properties of the original input image, which have been determined by the second statistical analyzer 250.

The statistical properties extracted by the first statistical analyzer 240 and the second statistical analyzer 250 may also include spatial properties (correlations) of the images and properties (marginal distribution statistics) of an intensity histogram corresponding to those described above with reference to FIG. 1. Particularly, a near-zero value of the auto-correlation function may also be determined in the same manner as moments of intensity and/or color distribution, including mean, variance, skewness, and kurtosis of the intensity distribution. To achieve this, a method represented by a technique of estimating random variables may be used.

The statistical property coder 260 codes the statistical properties extracted by the first statistical analyzer 240 and the second statistical analyzer 250. For coding, a method represented by a technique of coding numerical data ranging from a plain binary format to a highly-efficient entropy coding scheme may also be used.

The multiplexer 270 mixes the coded image that has been compressed and coded by the image/video coder 210 with the coded statistical properties that have been coded by the statistical property coder 260.

Note that the statistical property coder 260 and the multiplexer 270 may be designed to take a particular advantage of a container format for storing conventionally-coded image and coded video data such as JPEG and MPEG, and store the statistical properties as metadata of the conventionally-coded image data. In this respect, the output from the coding apparatus 200 is convertible with the conventional coding apparatus which can simply ignore additional statistical information. On the other hand, the decoding apparatus to be described in detail in a third embodiment may use additional statistical information in order to provide an enhanced output image.

Next, an operation of the image/video coding apparatus according to the present embodiment is described.

Figure 4:
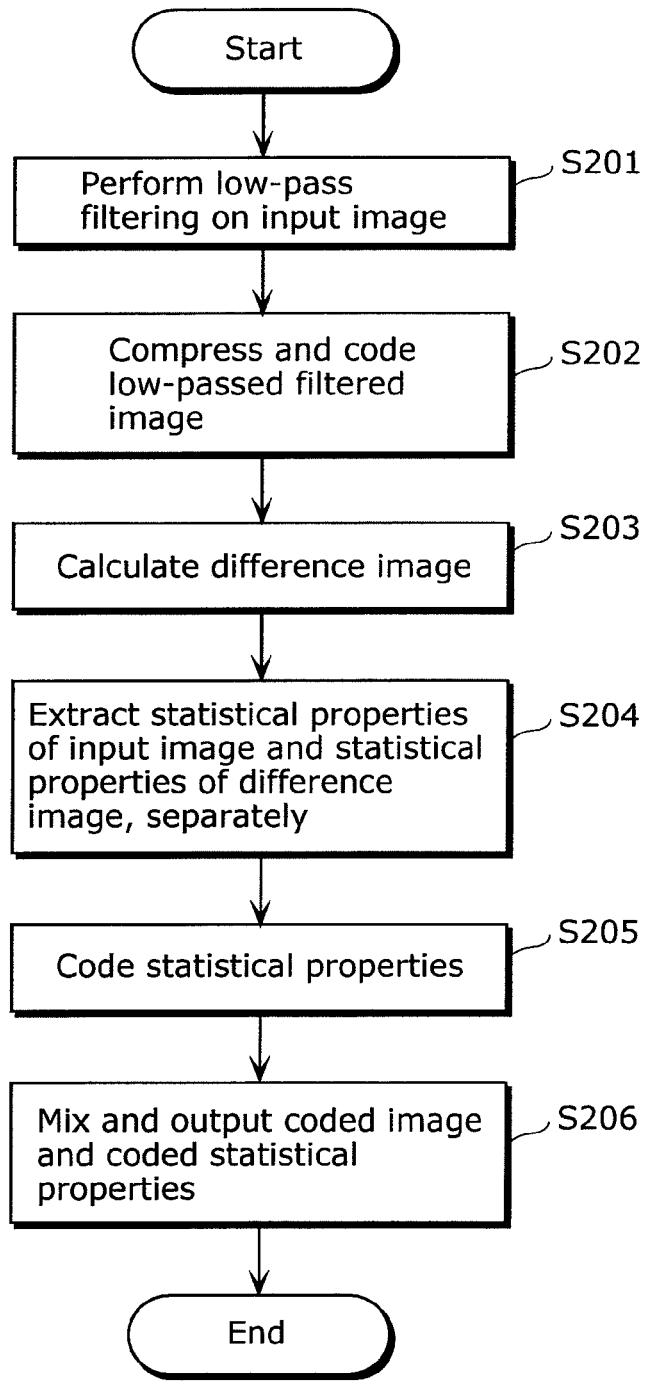
FIG. 4 is a flowchart showing an operation of the image/video coding apparatus according to the second embodiment.

FIG. 4 is a flowchart showing an operation of the image/video coding apparatus according to the present embodiment.

First, an input image is inputted to the image/video coder 210, the subtracter 230, and the first statistical analyzer 240. The image/video coder 210 performs low-pass filtering on the input image (S201). Then, the image/video coder 210 compresses the low-pass filtered image, and codes the compressed image (S202).

Next, the subtracter 230 calculates a difference image between the input image and the compressed image (S203). Specifically, the coded compressed image that has been coded by the image/video coder 210 is inputted to the image/video decoder 220. The image/video decoder 220 decodes the coded compressed image that is inputted, and outputs a decoded compressed image that is generated, to the subtracter 230. Then, the subtracter 230 calculates a difference image by subtracting the decoded compressed image from the input image. The calculated difference image is inputted to the second statistical analyzer 250.

Subsequently, the first statistical analyzer 240 and the second statistical analyzer 250 extract the statistical properties of the input image and the statistical properties of the difference image, respectively (S204). The extracted statistical properties are inputted to the statistical property coder 260.

The statistical property coder 260 codes the statistical properties of the input image and the statistical properties of the difference image, which have been extracted, respectively, by the first statistical analyzer 240 and the second statistical analyzer 250 (S205). The multiplexer 270 mixes and outputs the compressed image that has been coded by the image/video coder 210 and the statistical properties that have been coded by the statistical property coder 260 (S206).

With the processing described above, the coding apparatus 200 according to the present embodiment codes the statistical properties representing a frequency component that becomes missing when the input image is compressed, and mixes the coded statistical properties with the coded image, so as to output a mixed image. With this, it is possible to decode a frequency component that is originally missing, thus enhancing image quality.

Third Embodiment

Figure 5:
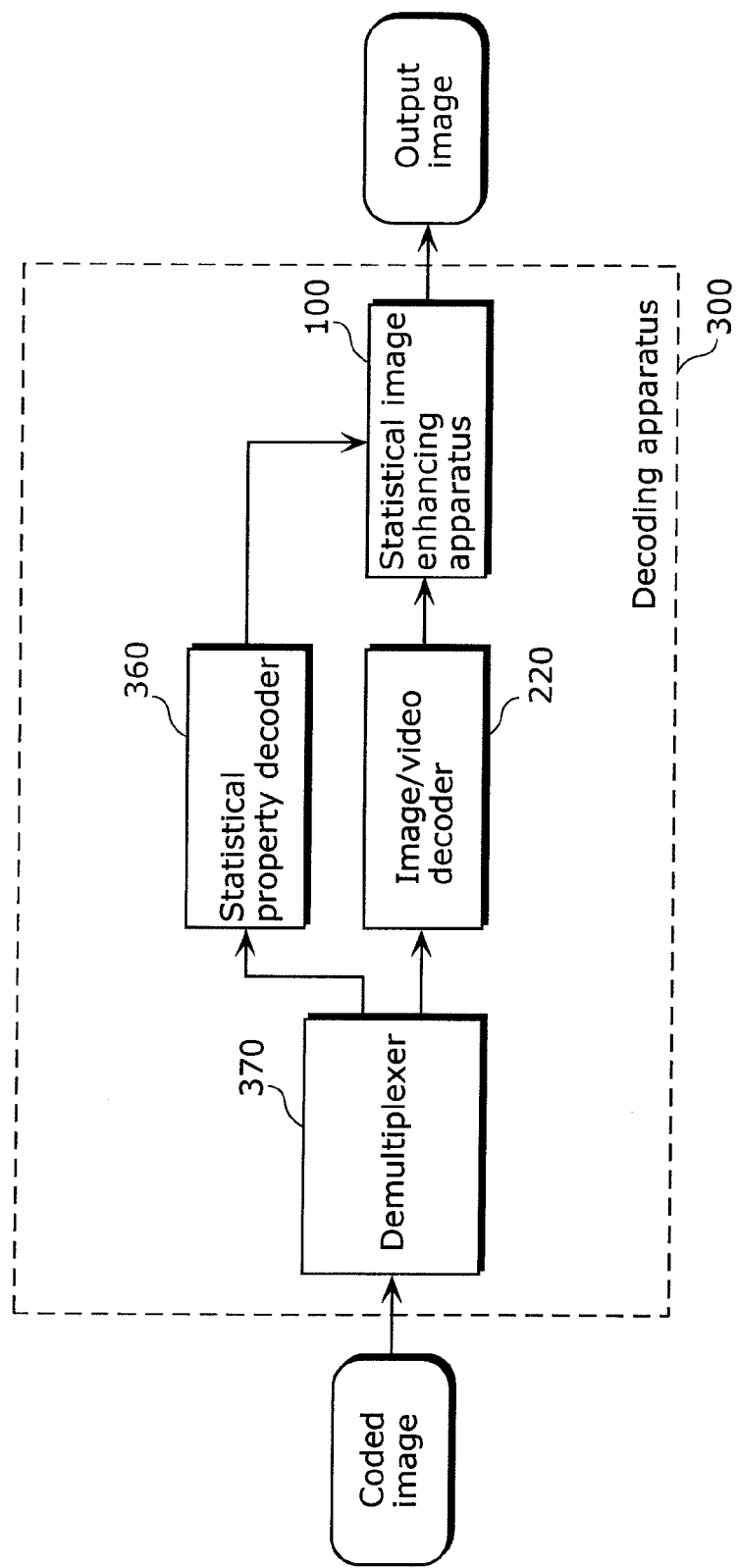
FIG. 5 is a block diagram showing a configuration of an image/video coding apparatus according to a third embodiment.

FIG. 5 is a block diagram showing a configuration of an image/video decoding apparatus according to a third embodiment. A decoding apparatus 300 shown in the figure includes a demultiplexer 370, a statistical property decoder 360, an image/video decoder 220, and a statistical image enhancing apparatus 100. Note that the statistical image enhancing apparatus 100 is the same as the statistical image enhancing apparatus 100 described in the first embodiment and the image/video decoder 220 is the same as the image/video decoder 220 described in the second embodiment, and thus the description thereof will be omitted.

The demultiplexer 370 separates the data representing the coded image or video, into the data indicating the coded statistical properties and the data indicating the coded image itself. Then, each of them is inputted to an appropriate one of the decoders, that is, the statistical property decoder 360 and a conventional image/video decoder 220.

The statistical property decoder 360 decodes the coded statistical properties separated by the demultiplexer 370. The statistical property decoder 360 decodes the statistical data in a manner corresponding to the coding method used for the statistical property coder 260 shown in FIG. 3.

The image/video decoder 220 may use any coding method as long as it corresponds to the method that has been used in generating the coded data.

As described above, the decoded image and the decoded statistical properties are supplied to the statistical image enhancing apparatus 100. As described with reference to FIG. 1, the statistical image enhancing apparatus 100 uses the statistical data to reconstruct a frequency component that is lost in the decoded image as a result of irreversible compression (coding error).

Next, an operation of the image/video coding apparatus according to the present embodiment is described.

Figure 6:
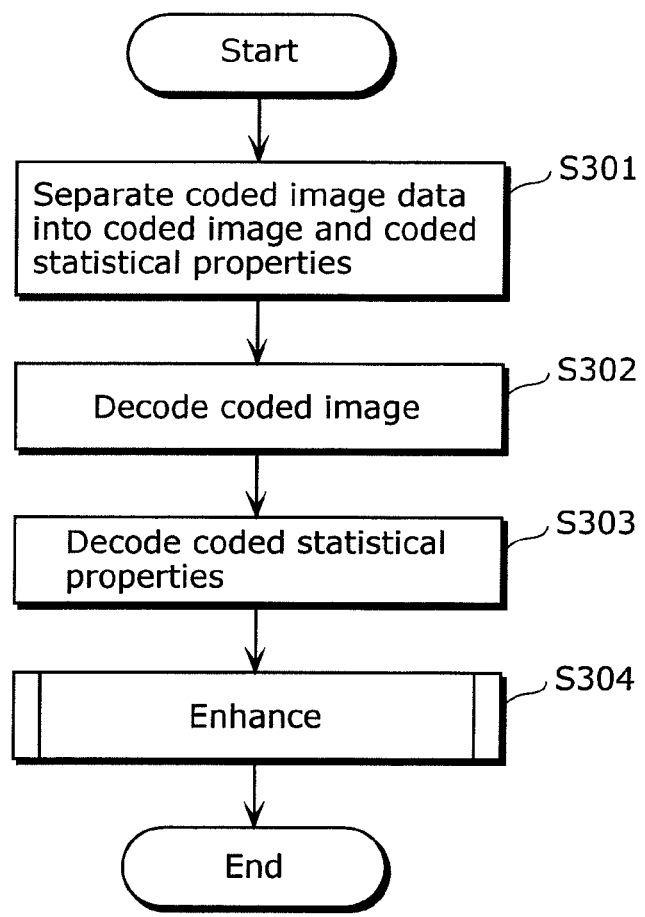
FIG. 6 is a flowchart showing an operation of the image/video coding apparatus according to the third embodiment.

FIG. 6 is a flowchart showing an operation of the image/video coding apparatus according to the present embodiment.

First, the coded image data is inputted, and the demultiplexer 370 separates the coded image data into a coded image itself and coded statistical properties (S301). The coded image itself is inputted to the image/video decoder 220, and the coded statistical properties are inputted to the statistical property decoder 360.

The image/video decoder 220 decodes the coded image that is inputted (S302). The decoded image is inputted to the statistical image enhancing apparatus 100 as an input image.

The statistical property decoder 360 decodes the coded statistical properties that are inputted (S303). The decoded statistical properties are inputted to the statistical image enhancing apparatus 100. At this time, the statistical properties of the difference image are inputted to the first image processing unit 120 and the second image processing unit 130 shown in FIG. 1. The statistical properties of the reference image are inputted to the third image processing unit shown in FIG. 1.

The statistical image enhancing apparatus 100 performs processing shown by the flowchart in FIG. 2 (S304).

With the processing described above, the decoding apparatus 300 of the present embodiment can separate the coded image data into the coded image and the coded statistical properties, so as to decode them separately. With this, the statistical image enhancing apparatus 100 shown in FIG. 1 can easily enhance the quality of the images by using the input image and the statistical properties thus obtained separately.

Thus, the subjective image quality of the decoded image can be improved without substantially increasing an amount of data to be coded. Particularly, in the context of video coding, a major gain in coding efficiency may be achieved. This is because the statistical properties of the coding error are likely to remain the same for at least an entire sequence of video images. Hence, the statistical properties must be determined, coded, and transmitted at least once for a plurality of video images. This may further be utilized to reduce a signal overhead.

Fourth Embodiment

An image processing apparatus according to the present embodiment includes the statistical image enhancing apparatus according to the first embodiment and at least two frame memories.

Figure 7:
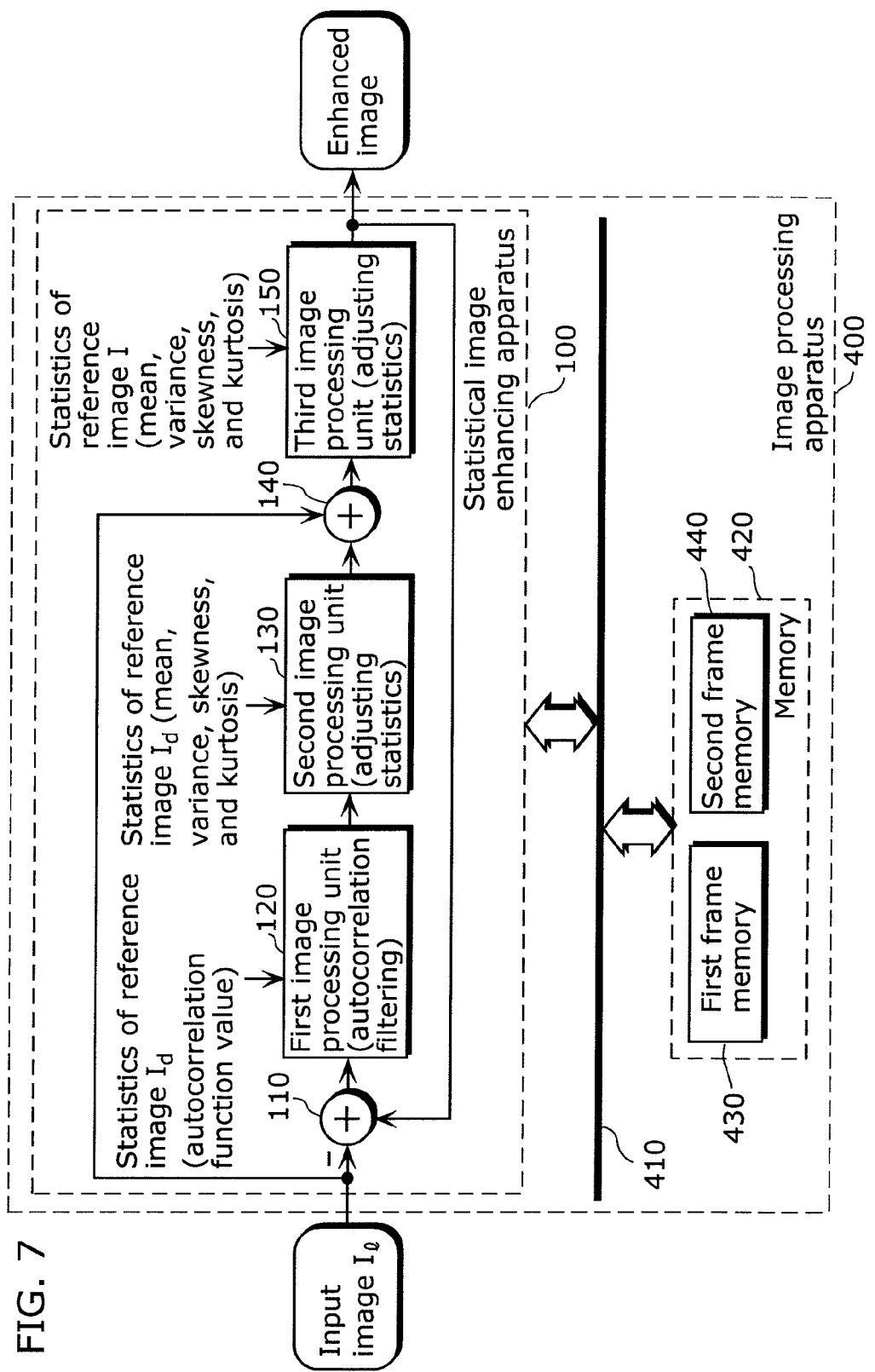
FIG. 7 is a block diagram showing a configuration of an image processing apparatus according to a fourth embodiment.

FIG. 7 is a block diagram showing a configuration of the image processing apparatus according to the present embodiment. An image processing apparatus 400 shown in the figure includes the statistical image enhancing apparatus 100, a bus 410, and a memory 420.

The statistical image enhancing apparatus 100 has the same configuration as the statistical image enhancing apparatus 100 shown in FIG. 1, and thus the description thereof will be omitted here. Note that the statistical image enhancing apparatus 100 according to the fourth embodiment can exchange data with the memory 420 via the bus 410.

The memory 420 includes at least two memories, a first frame memory 430 and a second frame memory 440.

The first frame memory 430 holds an input image received by the statistical image enhancing apparatus 100.

The second frame memory 440 holds an image currently being processed in the statistical image enhancing apparatus 100.

The statistical image enhancing apparatus 100 reads the image held in the second frame memory 440 when processing of image enhancement is completed, and outputs the image to the outside.

As described above, the image processing apparatus according to the present embodiment stores the input image and the image currently being processed, into the different frame memories. With this, when repeating the processing in the statistical image enhancing apparatus 100, it is possible to read the input image from one frame memory and the image currently being processed from the other frame memory, thus allowing each process to be performed using a simple configuration.

Thus far, the statistical image enhancing apparatus, the image coding apparatus, and the image decoding apparatus according to the present invention have been described based on the embodiments, but the present invention is not limited to these embodiments. Those skilled in the art will readily appreciate that many modifications are possible in the exemplary embodiments without departing from the novel teachings and advantages of this invention. Accordingly, all such modifications are intended to be included within the scope of this invention.

For example, the present invention may also be used to improve a compression gain by maintaining image quality at a constant level, instead of improving the subjective image quality and maintaining the amount of data to be transmitted or stored at a constant level. For example, a more accurate quantization may be compensated by using the statistical image enhancing method according to the present invention.

Figure 8:
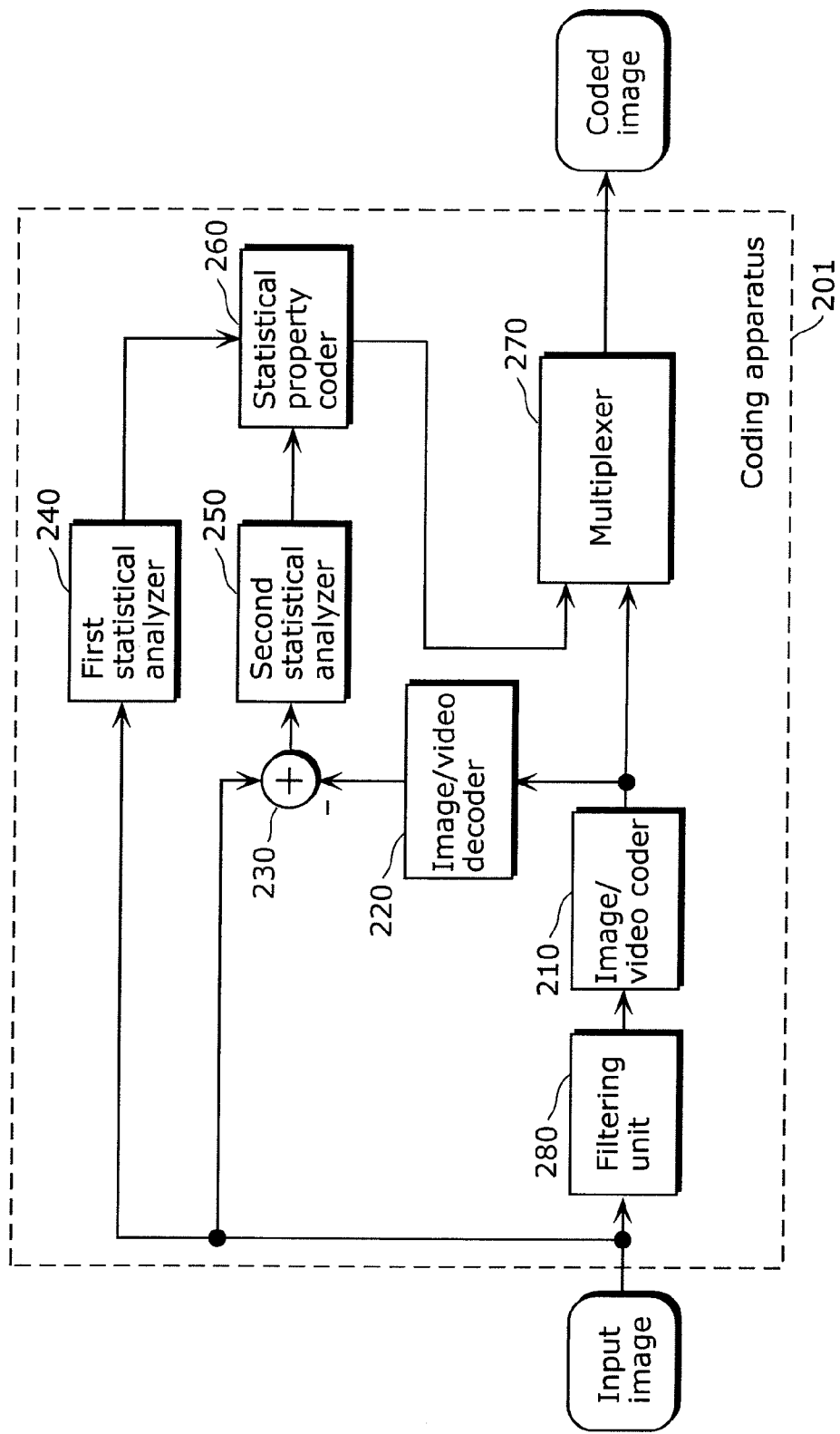
FIG. 8 is a block diagram showing a configuration of a variation of the image/video coding apparatus according to the second embodiment.

Note that according to the present invention, the input image is low-pass filtered before supplied to the image/video coder 210 shown in FIG. 3. FIG. 8 is a block diagram showing a configuration of a variation of the image/video coding apparatus according to the second embodiment. The coding apparatus 201 shown in the figure is different from the coding apparatus 200 shown in FIG. 3 in that a filtering unit 280 is further added. The following will describe the difference, and the description of the same points will be omitted.

The filtering unit 280 performs low-pass filtering on the input image. Then, the input image that has been low-pass filtered is supplied to the image/video coder 210. The image/video coder 210 compresses the input image that has been low-pass filtered, and codes the compressed image that is generated.

With this, due to attenuation of the high-frequency component, it is possible to code the low-pass filtered image more efficiently. Then, the statistical properties may also be used on the decoder side so as to reconstruct the missing frequency component. However, it is not essential to perform such low-pass filtering onto the input image.

Note that it is possible to realize the present invention not only as a statistical image enhancing apparatus, an image coding apparatus, and an image decoding apparatus but also as a method including, as steps, the processing units included in the apparatuses described above. In addition, these steps may also be realized as a program causing a computer to execute these steps. Furthermore, the present invention may also be realized by storing the program on a recoding medium such as a computer readable recoding medium such as a compact disc read only memory (CD-ROM), and information, data, or a signal indicating the program. Moreover, such program, information, data, and signal as these may also be transmitted via a communication network such as the Internet.

In addition, part or all of the constituent elements configuring each of the apparatus described above may also be configured with a system large scale integration (LSI). The system LSI is a super-multifunctional LSI manufactured by integrating plural constituent parts on a single chip, and is specifically a computer system including a microprocessor, a read-only memory (ROM), and a random access memory (RAM).

As described above, in summary, the present invention is related to enhancing image quality by utilizing the statistical properties of the reference image. Particularly, the image may be sharpened by reconstructing the missing frequency component which corresponds to the statistical constrains determined from higher order statistical properties of the reference image which corresponds to a difference between the original image and the low-pass filtered image. This form of statistical image enhancement may also be applicable to image and video coding so as to obtain excellent image quality with a highly compressed gain by transmitting the statistical properties of the coding error along with the coded image.

INDUSTRIAL APPLICABILITY

The present invention relates to an apparatus which enhances image quality, and is applicable, for example, to an image/video coding apparatus, an image/video decoding apparatus, and so on.

The invention claimed is:

1. An image coding method, comprising:
compressing an input image;
coding a compressed image generated in said compressing;
calculating a difference image between the input image and the compressed image;
extracting a statistical property of the difference image calculated in said calculating of the difference image;
coding the statistical property of the difference image, which has been extracted in said extracting of the statistical property of the difference image,
extracting a statistical property of the input image; and
coding the statistical property of the input image, which has been extracted in said extracting of the statistical property of the input image,
wherein the statistical property of the difference image includes an autocorrelation function value of the difference image and at least one of mean, variance, skewness, and kurtosis of pixel values of the difference image, the statistical property of the difference image being extracted in said extracting of the statistical property of the difference image.

2. The image coding method according to claim 1, wherein the statistical property of the difference image includes an autocorrelation function value of the difference image and at least one of mean, variance, skewness, and kurtosis of pixel values of the difference image, the statistical property of the difference image being extracted in said extracting of the statistical property of the difference image.

3. The image coding method according to claim 1, wherein the statistical property of the input image includes at least one of mean, variance, skewness, and kurtosis of pixel values of the input image, the statistical property of the input image being extracted in said extracting of the statistical property of the input image.

4. The image coding method according to claim 1, wherein in said compressing, the input image is compressed by a conversion-based coding method.

5. The image coding method according to claim 1, further comprising low-pass filtering an original image to generate the input image, wherein in said compressing, the input image that is generated by said low-pass filtering of the original image is compressed.

6. An image decoding method, comprising:
decoding a compressed image;
decompressing a decoded image generated in said decoding of the compressed image;
decoding a statistical property of a difference image;
generating a first filter, based on the statistical property of the difference image decoded in said decoding of the statistical property of the difference image;
applying the first filter to a decompressed image generated in said decompressing to generate a filtered image;
adding the filtered image to the decompressed image to generate an output image,
decoding a statistical property of a reference image;
generating a second filter based on the statistical property of the reference image, which has been decoded in said decoding of the statistical property of the reference image; and
applying the second filter to the output image.

7. The image decoding method according to claim 6, wherein the first filter is adapted to adjust a statistical property of the filtered image to the statistical property of the difference image, which has been decoded in said decoding of the statistical property of the difference image.

8. The image decoding method according to claim 7, wherein the statistical property of the difference image includes an autocorrelation function value of the difference image and at least one of mean, variance, skewness, and kurtosis of pixel values of the difference image, the statistical property of the difference image being decoded in said decoding of the statistical property of the difference image.

9. The image decoding method according to claim 8, further comprising extracting a statistical property of the decompressed image, the statistical property of the decompressed image including an autocorrelation function value of the decompressed image and at least one of mean, variance, skewness, and kurtosis of pixel values of the decompressed image,
wherein the first filter is generated based on the statistical property of the difference image and the statistical property of the decompressed image, the statistical property of the difference image being decoded in said decoding of the statistical property of the difference image, and the statistical property of the decompressed image being extracted in said extracting of the statistical property of the decompressed image.

10. The image decoding method according to claim 6, wherein the second filter is adapted to adjust the statistical property of the output image to the statistical property of the reference image, which has been decoded in said decoding of the statistical property of the reference image.

11. The image decoding method according to claim 10, wherein the statistical property of the reference image includes at least one of mean, variance, skewness, and kurtosis of pixel values of the reference image, the statistical property of the reference image being decoded in said decoding of the statistical property of the reference image.

12. The image decoding method according to claim 11, further comprising extracting a statistical property of the output image, the statistical property of the output image including at least one of mean, variance, skewness, and kurtosis of pixel values of the output image,
wherein the second filter is generated based on the statistical property of the reference image and the statistical property of the output image, the statistical property of the reference image being decoded in said decoding of the statistical property of the reference image, and the statistical property of the output image being extracted in said extracting of the statistical property of the output image.

13. The image decoding method according to claim 6, further comprising;
calculating a difference between the output image and the decoded image;
applying the first filter to the difference calculated in said calculating of the difference to generate a re-filtered image; and
adding the re-filtered image to the decompressed image.

14. The image decoding method according to claim 6, wherein, in said decompressing, the decoded image is decompressed by a coding method based on conversion.

15. An image enhancing method, comprising:
receiving an input image;
receiving a statistical property of a difference image;
generating a first filter, based on the statistical property of the difference image, which has been received in said receiving the statistical property of the difference image;
applying the first filter to the input image, so as to generate a filtered image;
adding the filtered image to the input image to generate an output image;
receiving a statistical property of a reference image;
generating a second filter based on the statistical property of the reference image, which has been received in said receiving of the statistical property of the reference image; and
applying the second filter to the output image.

16. The image enhancing method according to claim 15, wherein the first filter is adapted to adjust the statistical property of the filtered image to the statistical property of the difference image, which has been received in said receiving the statistical property of the difference image.

17. The image enhancing method according to claim 16, wherein the statistical property of the difference image includes an auto correlation function value of the difference image and at least one of mean, variance, skewness, and kurtosis of pixel values of the difference image, the statistical property of the difference image being received in said receiving of the statistical property of the difference image.

18. The image enhancing method according to claim 17, further comprising extracting a statistical property of the input image, the statistical property of the input image including at least one of mean, variance, skewness, and kurtosis of pixel values of the input image,
wherein the first filter is generated based on the statistical property of the difference image and the statistical property of the input image, the statistical property of the difference image being received in said receiving of the statistical property of the difference image, and the statistical property of the input image being extracted in said extracting of the statistical property of the input image.

19. The image enhancing method according to claim 15, wherein the second filter is applied so as to adjust a statistical property of the output image to the statistical property of the reference image, which has been received in said receiving of the statistical property of the reference image.

20. The image enhancing method according to claim 19, wherein the statistical property of the reference image includes at least one of mean, variance, skewness, and kurtosis of pixel values of the reference image, the statistical property of the reference image being received in said receiving of the statistical property of the reference image.

21. The image enhancing method according to claim 20, further comprising extracting the statistical property of the output image, the statistical property of the output image including at least one of mean, variance, skewness, and kurtosis of pixel values of the output image,
   wherein the second filter is generated based on the statistical property of the reference image and the statistical property of the output image, the statistical property of the reference image being received in said receiving of the statistical property of the reference image, and the statistical property of the output image being extracted in said extracting of the statistical property of the output image.

22. The image enhancing method according to claim 15, further comprising:
   calculating a difference between the output image and the input image;
   applying the first filter to the difference calculated in said calculating difference to generate a re-filtered image; and
   adding the re-filtered image to the input image.

23. An image coding apparatus, comprising:
   an image coding circuit which compresses an input image and codes a compressed image that is generated;
   a difference image calculating circuit which calculates a difference image between the input image and the compressed image;
   a first property extracting circuit which extracts a statistical property of the difference image calculated by said difference image calculating circuit;
   a first property coding circuit which codes the statistical property of the difference image, which has been extracted by said first property extracting circuit;
   a second property extracting circuit which extracts a statistical property of the input image; and
   a second property coding circuit which codes the statistical property of the input image, which has been extracted by said second property extracting circuit,
   wherein the statistical property of the difference image includes an autocorrelation function value of the difference image and at least one of mean, variance, skewness, and kurtosis of pixel values of the difference image, the statistical property of the difference image being extracted by said first property extracting circuit.

24. An image decoding apparatus, comprising:
   an image decoding circuit which decodes a compressed image and decompresses a decoded image that is generated;
   a first property decoding circuit which decodes a statistical property of a difference image;
   a first filter generation circuit which generates a filter, based on the statistical property of the difference image, which has been decoded by said first property decoding circuit;
   a first filtering circuit which applies the first filter to a decompressed image that is generated by said image decoding circuit to generate a filtered image;
   an addition circuit which adds the filtered image to the decompressed image to generate an output image;
   a second property decoding circuit which decodes a statistical property of a reference image;
   a second filter generation circuit which generates a second filter, based on the statistical property of the reference image, which has been decoded by said second property decoding circuit; and
   a second filtering circuit which applies the second filter to the output image.

25. An image enhancing apparatus, comprising:
   an image receiving unit circuit which receives an input image;
   a first property receiving circuit which receives a statistical property of a difference image;
   a first filter generation circuit which generates a first filter, based on the statistical property of the difference image, which has been received by said first property receiving circuit;
   a filtering circuit which applies the first filter to the input image to generate a filtered image;
   an addition circuit which adds the filtered image to the input image to generate an output image;
   a second property receiving circuit which receives a statistical property of a reference image;
   a second filter generation circuit which generates a second filter, based on the statistical property of the reference image, which has been received by said second property receiving circuit; and
   a second filtering circuit which applies the second filter to the output image.

26. An image processing apparatus, comprising:
   an image receiving circuit which receives an input image;
   a first frame memory configured to hold the input image received by said image receiving circuit;
   a first property receiving circuit which receives a statistical property of a difference image;
   a first filter generation circuit which generates a first filter, based on the statistical property of the difference image, which has been received by said first property receiving circuit;
   a first filtering circuit which applies the first filter to the input image read from said first frame memory to generate a filtered image;
   an addition circuit which adds the filtered image to the input image to generate an output image;
   a second frame memory configured to hold an image that is being processed by said first filtering circuit and said addition circuit;
   a second property receiving circuit which receives a statistical property of a reference image;
   a second filter generation circuit which generates a second filter, based on the statistical property of the reference image, which has been received by said second property receiving circuit; and
   a second filtering circuit which applies the second filter to the output image.

27. An image processing system, comprising:
   an image coding circuit which compresses an input image and codes a compressed image that is generated;
   a difference image calculating circuit which calculates a difference image between the input image and the compressed image;
   a first property extracting circuit which extracts a statistical property of the difference image calculated by said difference image calculating circuit;
   a first property coding circuit which codes the statistical property of the difference image, which has been extracted by said first property extracting circuit;
   a second property extracting circuit which extracts a statistical property of the input image;
   a second property coding circuit which codes the statistical property of the input image, which has been extracted by said second property extracting circuit;

an image decoding circuit which decodes the compressed image and decompresses a decoded image that is generated;

a first property decoding circuit which decodes the statistical property of the difference image;

a first filter generation circuit which generates a first filter, based on the statistical property of the difference image, which has been decoded by said first property decoding circuit;

a first filtering circuit which applies the first filter to a decompressed image generated by said image decoding circuit to generate a filtered image;

an addition circuit which adds the filtered image to the decompressed image to generate an output image;

a second property decoding circuit which decodes a statistical property of a reference image;

a second filter generation circuit which generates a second filter, based on the statistical property of the reference image, which has been decoded by said second property decoding circuit; and a second filtering circuit which applies the second filter to the output image.

28. A non-transitory computer-readable recording medium having a program recorded thereon, the program causing a computer to execute a method comprising:

receiving an input image;

receiving a statistical property of a difference image;

generating a first filter, based on the statistical property of the difference image, which has been received in said receiving of the statistical property of the difference image;

applying the first filter to the input image to generate a filtered image;

adding the filtered image to the input image to generate an output image;

receiving a statistical property of a reference image;

generating a second filter, based on a statistical property of the reference image, which has been received in said receiving of the statistical property of the reference image; and applying the second filter to the output image.

29. An integrated circuit, comprising:

an image receiving circuit which receives an input image;

a first property receiving circuit which receives a statistical property of a difference image;

a first filter generation circuit which generates a first filter, based on the statistical property of the difference image, which has been received by said first property receiving circuit;

a first filtering circuit which applies the first filter to the input image to generate a filtered image;

an addition circuit which adds the filtered image to the input image to generate an output image;

a second property receiving circuit which receives a statistical property of a reference image;

a second filter generation circuit which generates a second filter, based on the statistical property of the reference image, which has been received by said second property receiving circuit; and a second filtering circuit which applies the second filter to the output image.

* * * * *

UNITED STATES PATENT AND TRADEMARK OFFICE
CERTIFICATE OF CORRECTION

| | | |
|---|---|---|
| PATENT NO. | : 8,588,545 B2 | Page 1 of 1 |
| APPLICATION NO. | : 12/663872 | |
| DATED | : November 19, 2013 | |
| INVENTOR(S) | : Thomas Wedi et al. | |

It is certified that error appears in the above-identified patent and that said Letters Patent is hereby corrected as shown below:

On the title page below item (57) Abstract "29 Claims 8 Drawing Sheets" should read --28 Claims 8 Drawing Sheets--.

In the Claims:

Col. 14, line 49, In Claim 2

Claim 2 should be deleted.

Col. 16, line 24, In Claim 15, line 7

"applying the first filter to the input image, so as to generate" should be --applying the first filter to the input image to generate--.

Col. 16, line 60, In Claim 19, line 2

"wherein the second filter is applied so as to adjust a statistical" should be --wherein the second filter is applied to adjust a statistical--.

Col. 17, line 21, In Claim 22, line 6

"calculating difference to generate a re-filtered image;" should be --calculating of the difference to generate a re-filtered image;--.

Signed and Sealed this
Twenty-seventh Day of May, 2014

Michelle K. Lee
*Deputy Director of the United States Patent and Trademark Office*